United States Patent

Matsuo et al.

[11] Patent Number: 5,927,755
[45] Date of Patent: Jul. 27, 1999

[54] KNEE BOLSTER STRUCTURE

[75] Inventors: Shigeki Matsuo; Tadahiro Matsumoto; Hiroyuki Nagae; Yoshiharu Sonoda, all of Kanagawa, Japan

[73] Assignee: Isuzu Motors Limited, Tokyo, Japan

[21] Appl. No.: 09/016,270

[22] Filed: Jan. 30, 1998

[30] Foreign Application Priority Data

Jan. 31, 1997 [JP] Japan .................................. 9-031491

[51] Int. Cl.[6] .................................................. B60R 21/04
[52] U.S. Cl. ........................ 280/752; 280/751; 280/748; 296/70
[58] Field of Search ........................... 248/27.3; 280/748, 280/751, 752, 753; 296/70, 192

[56] References Cited

U.S. PATENT DOCUMENTS

| | | | |
|---|---|---|---|
| 3,984,128 | 10/1976 | Oehm et al. | 280/751 |
| 5,037,130 | 8/1991 | Okuyama | 280/752 |
| 5,518,270 | 5/1996 | Hanada et al. | 280/751 |
| 5,752,718 | 5/1998 | Schnabel et al | 280/752 |

FOREIGN PATENT DOCUMENTS

| | | |
|---|---|---|
| 2-175455 | 7/1990 | Japan . |
| 7-81508 | 3/1995 | Japan . |
| 7-267026 | 10/1995 | Japan . |

*Primary Examiner*—Derek J. Berger
*Assistant Examiner*—Long Dinh Phan
*Attorney, Agent, or Firm*—Sughrue, Mion, Zinn, Macpeak & Seas, PLLC

[57] ABSTRACT

The knee bolster structure to be mounted on an instrument panel 13 comprises a panel 2 and a stay 3 for supporting the panel 2, while the stay 3 is composed of a stay main body 4 and patch 5 so disposed on the stay main body 4 as to cover the stay main body 4. In a vehicle collision, the stay 3 is deformed starting from notches 8 respectively formed in the stay main body 4 but, during the deformation of the stay 3, the leading end side 11 of a top plate 9 provided in the patch 5 is butted against the bottom surface 6 of the stay main body 4, thereby being able to prevent stresses from being concentrated onto the notches 8. Also, since the wall portions 7 of the stay main body 4 are held by the side walls 10 of the patch 5, they are prevented from being opened outwardly. Due to this structure, the drag of the stay 3 or the knee bolster structure can be stabilized, so that shock energy caused in the vehicle collision can be absorbed efficiently.

2 Claims, 7 Drawing Sheets

KNEE BOLSTER STRUCTURE

BACKGROUND OF THE INVENTION

1. Field of the Invention

The present invention relates to a knee bolster structure which is mounted onto an instrument panel provided in a vehicle in order to buffer a shock transmitted to the thigh portion of an occupant from the knee thereof in a vehicle collision or the like.

2. Related art

For example, when a vehicle collision occurs, since an occupant wears a seat belt, the upper body of the occupant is restricted toward the seat side of the vehicle. However, the knees of the occupant are caused to project forwardly to strike against the instrument panel side of the vehicle, so that the thigh portions of the occupant are heavily damaged through the knees. Conventionally, there is provided a knee bolster which is used to absorb or buffer the shocks given to the thigh portions of the occupant due to the secondary collision of the occupant in a vehicle collision. Here, as energy absorbing means such as a knee bolster, such means is assumed to be efficient that can be displaced while maintaining a given level of deceleration, that is, a given level of drag in a displaceable range. In view of this, the conventional knee bolster is also devised elaborately so that it is able to perform the above-mentioned function.

In FIG. 10, there is shown a conventional knee bolster which is generally used. The present knee bolster 1a comprises a panel 2 for closing an opening 16 formed in an instrument panel 13, and two stays 3a each of which has one end side to be fixed to the panel 2 with the other end side to be fixed to a reinforcement (not shown).

The stay 3a, as shown in FIGS. 10 and 11, includes a bottom surface 6 and two wall portions 7 respectively rising up from the two sides of the bottom surface 6, while the stay 3a has an upwardly facing U-shaped section. Also, as shown in FIG. 12, a notch 8 is formed substantially in the central portion of each of the wall portions 7. The notch 8 is used to stabilize the deformation of the stay 3a in an vehicle collision or the like and, due to formation of the notch 8, in a vehicle collision or the like, the stay 3a can begin to deform around the notch 8 formation portion. This allows the knee bolster 1a to make a constant displacement regardless of the operation direction of a collision force. By the way, instead of the notch 8, there may be opened up a hole in the notch 8 formation portion.

Conventionally, there are known many techniques which relate to the knee bolster. For example, some of them are disclosed in Japanese Patent Publication No. 2-175455 of Heisei, Japanese Patent Publication No. 7-267026 of Heisei, Japanese Patent Publication No. 7-81508 of Heisei, and the like. In particular, in Japanese Patent Publication No. 2-175455 of Heisei, there is disclosed a knee protector structure for a vehicle which comprises a protector main body (which corresponds to the above-mentioned panel) (5) and a knee protector upper (which corresponds to the above-mentioned stay) (3); while, the knee protector upper (3) includes bending portions (13) bendable due to a shock load acting on the protector main body (5), and a bent member (17) bridging over the bending portions (13) and having two end portions respectively fixed to the knee protector upper (3).

Also, in Japanese Patent Publication No. 7-267026 of Heisei, there is disclosed a knee protector structure for a vehicle which comprises a pair of substantially V-shaped brackets (which correspond to the above-mentioned stay) (11) each having a bending line (11a) in the bottom portion thereof, and a knee protector main body (which corresponds to the above-mentioned panel) (12) which is disposed in the rear of the bending lines (11a) between the pair of brackets (11), (11); and, each of the brackets (11) includes a recessed portion or a projecting portion which extends along the longitudinal direction thereof. The recessed portion or projecting portion is formed such that the level difference amount thereof is larger in the front portion of the bending line (11a) than in the rear portion of the bending line (11a) and increases gradually from the bending line (11a) toward the front end portion thereof. Also, on the bracket (11), there is mounted a substantially V-shaped upper bracket (18) including a bending line (18a) which is so formed as to bridge over the above-mentioned bending line (11a). That is, according to the present knee protector structure, the brackets are bent around the bending lines (11a) and (18a) to thereby absorb the shock energy stably and, at the same time, the level difference amount of the recessed portion or projecting portion is so set as to increase gradually toward the front end portion thereof to thereby prevent the knee protector from being vibrated in a vehicle collision or the like.

Further, in Japanese Patent Publication No. 7-81508 of Heisei, there is disclosed a knee protector for a car which comprises a first member (11), which is bent formed into a substantially V-like shape having the front end side thereof fixed to a steering member (2) and has a substantially U-shaped transverse section, and a second member (12) which is fixed at the two front and rear portions thereof to the first member (11) and is disposed on the upper side of the first member (11); and, the second member (12) has a shape which can be fitted into the first member (11) in a car collision or the like. That is, the present knee protector for a car is characterized in that the fitting of the second member (12) into the first member (11) facilitates and stabilizes the deformation of the knee protector to thereby prevent a crushing stroke from being interfered in a car collision or the like.

In the case of the conventional knee bolster 1a shown in FIGS. 10 to 12, as shown in FIG. 13, in a vehicle collision or the like, the panel 2 is pushed by the knee 15 of the occupant and is bent starting from the notch 8 portion thereof to thereby be able to stabilize the mode of deformation thereof; but, when the deformation starts, stresses are concentrated onto the notch 8 portion thereof to thereby reduce the drag of the bolster 1a. That is, in the conventional knee bolster 1a, there arise a problem that a constant level of drag, which is one of necessary functions as a knee bolster, cannot be maintained. Also, there is found another problem that, as shown in FIG. 14, in the latter half stage of the deformation thereof, the wall portion 7 of the stay 3a is opened outwardly so that the modulus of section thereof is lowered to thereby reduce the drag thereof.

Here, FIG. 9 is a graphical representation of relationships between the displacement of a knee bolster structure and a load to be applied thereto in the prior art and in the present invention. In particular, in the above-mentioned conventional knee bolster 1a, as shown by a dotted line C in FIG. 9, the load drops down extremely on the way and, as a reaction against to this extreme drop, there occurs an extreme peak in the load.

On the other hand, the above-cited known structures have their own characteristics but they also have the following problems: That is, in the knee protector structure disclosed in Japanese Patent Publication No. 2-175455 of Heisei, in spite of formation of the bending portion (13), the bending portion (13) is reinforced by the bent member (17), which is easy to raise a problem that the shock energy cannot be absorbed smoothly in a vehicle collision or the like. Also, there is found another problem that the flange (11) of the knee protector upper (3) can be opened outwardly in the latter half stage of the deformation thereof to thereby reduce the drag of the knee protector structure.

Also, in the knee protector disclosed in Japanese Patent Publication No.7-267026 of Heisei, provision of the bending lines (11a) and (18a) in the bracket (11) and upper bracket (18) can facilitate the absorption of the shock energy in a vehicle collision or the like; however, the object of this known structure is to prevent the vibration of the knee protector in a vehicle collision and, as a result of this, there is disclosed no device to maintain the drag of the knee protector at a constant level.

Further, in the knee protector disclosed in Japanese Patent Publication No. 7-81508 of Heisei, use of the substantially V-shaped first member (11) facilitates the deformation of the knee protector in a vehicle collision or the like to thereby absorb the shock energy and, at the same time, while the first member (11) is reinforced by the second member (12) properly, the second member (12) is fitted into the first member (11) to prevent interference with a crushing stroke, thereby facilitating the absorption of the shock energy. However, there is disclosed a rather insufficient device for stabilization of the drag of the knee protector and the whole structure is rather complicated and thus expensive in cost.

The present invention aims at eliminating the above-mentioned problems found in the conventional kneel bolster structures. Accordingly, it is an object of the invention to provide a simple and easy knee bolster structure which, while maintaining the drag thereof at a constant level, can absorb the shock energy to thereby buffer the shock applied from the knee portion of the occupant to the thigh portion thereof.

SUMMARY OF THE INVENTION

In attaining the above object, according to the invention, there is provided a knee bolster structure, comprising: a panel, which is mounted on the instrument panel of a vehicle and against which the knees of an occupant can be butted in a vehicle collision or the like; and, a stay having one end side fixed to the panel with the base end side thereof fixed to a reinforcement. In particular, the present knee bolster structure is characterized in that the stay is composed of a stay main body having an upwardly facing U-shaped section and including a bottom surface and two wall portions respectively rising up from the two sides of the bottom surface, with the bottom surface and wall portions being formed integrally with each other, and a patch having a downwardly facing U-shaped section and including a top plate with two side walls on the two sides thereof for covering the stay main body, the patch being fixable to the stay main body in such a manner that the side walls thereof are respectively fitted into the two wall portions of the stay main body from outside; the stay main body includes two notches respectively formed substantially in the central portions of the two wall portions thereof; and, the leading end side of the top plate of the patch is formed such that it can be contacted with the bottom surface of the stay main body when the stay main body is bent. In more particular, the two side walls of the patch are respectively fitted into the wall portions of the stay main body at positions displaced from the portions where the notches are formed, and the leading end side of the top plate of said patch is situated at a position which is nearer to the base end side of the stay main body than the formation portions of the notches.

In a vehicle collision or the like, if the knee of an occupant is abutted against the panel, then the stay begins to deform around the notch to thereby absorb shock energy. When the deformation of the stay progresses to a certain degree, the leading end side of the top plate of the patch is butted against the bottom surface of the stay main body to thereby reinforce the main body and thus prevent stresses from being concentrated onto the notch formation portion. This in turn prevents the drag of the knee bolster structure from being lowered. Also, because the side walls of the patch are respectively fitted into the two wall portions of the stay main body from outside, the two wall portions of the stay main body are prevented from being opened outwardly, thereby being able to prevent lowering of the drag of the knee bolster structure. Due to this, the present knee bolster structure is able to absorb the shock energy while maintaining the drag force thereof substantially at a constant level, thereby being able to secure the safety of the occupant in a vehicle collision or the like.

DETAILED DESCRIPTION OF THE PREFERRED EMBODIMENTS

Figure 1:
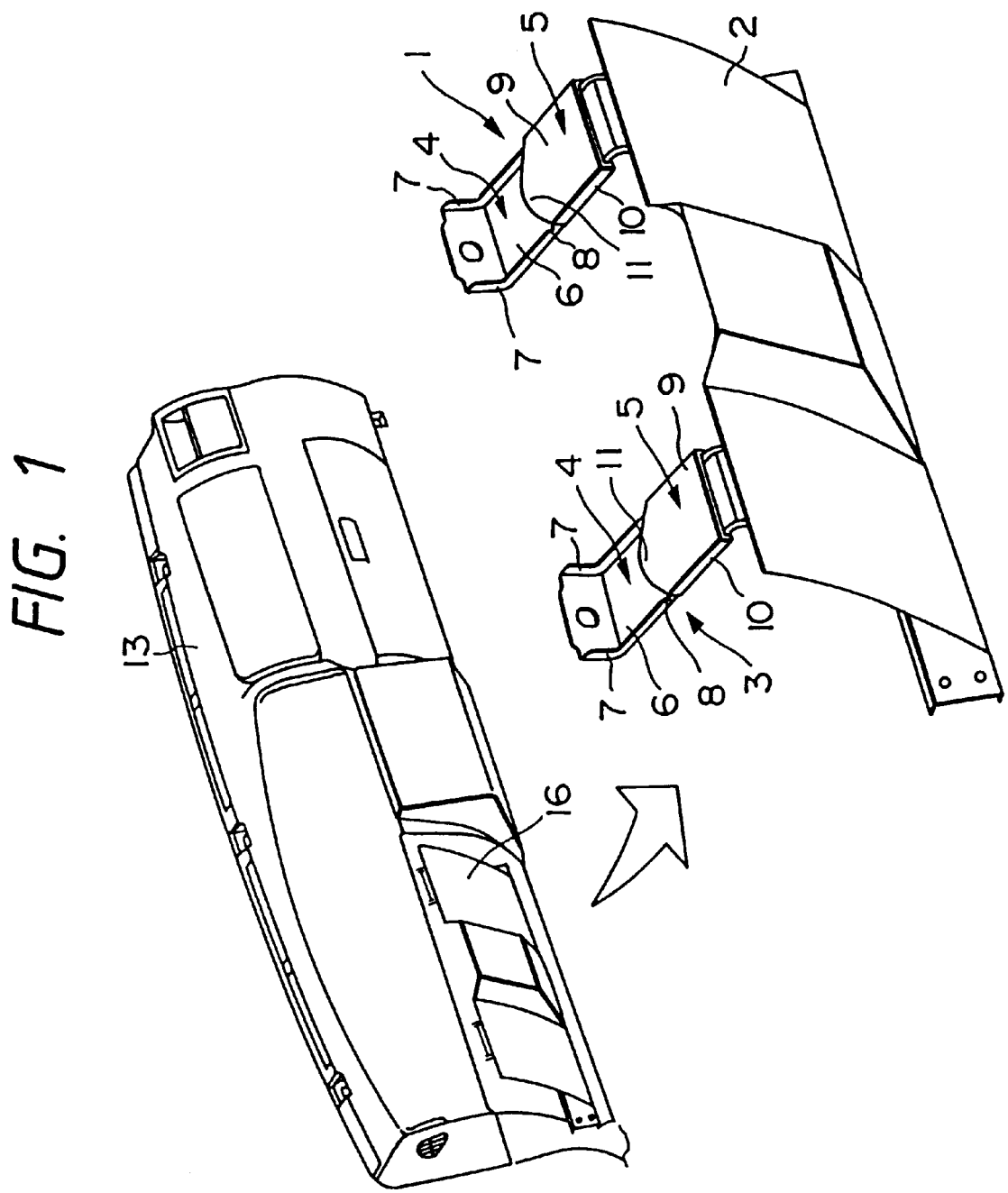
FIG. 1 is a perspective view of the whole structure of a knee bolster structure according to the invention, explaining the mounting position thereof.
Figure 12:
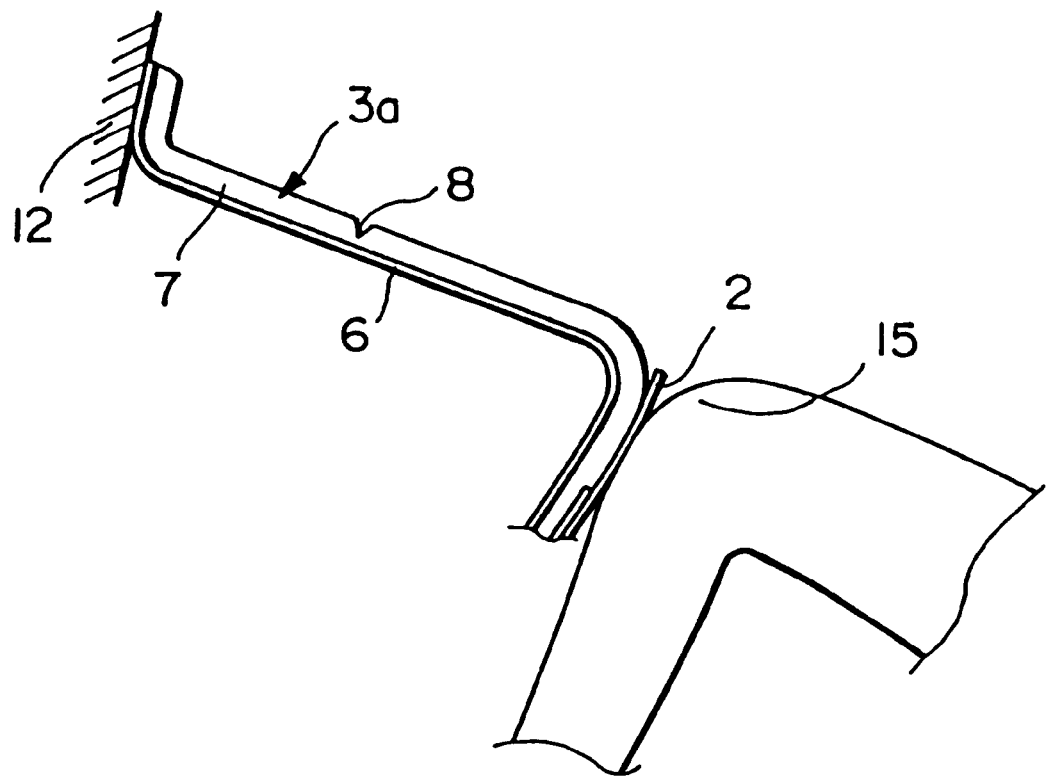
FIG. 12 is a side view of the conventional knee bolster structure, showing the early stage of deformation thereof.
Figure 13:
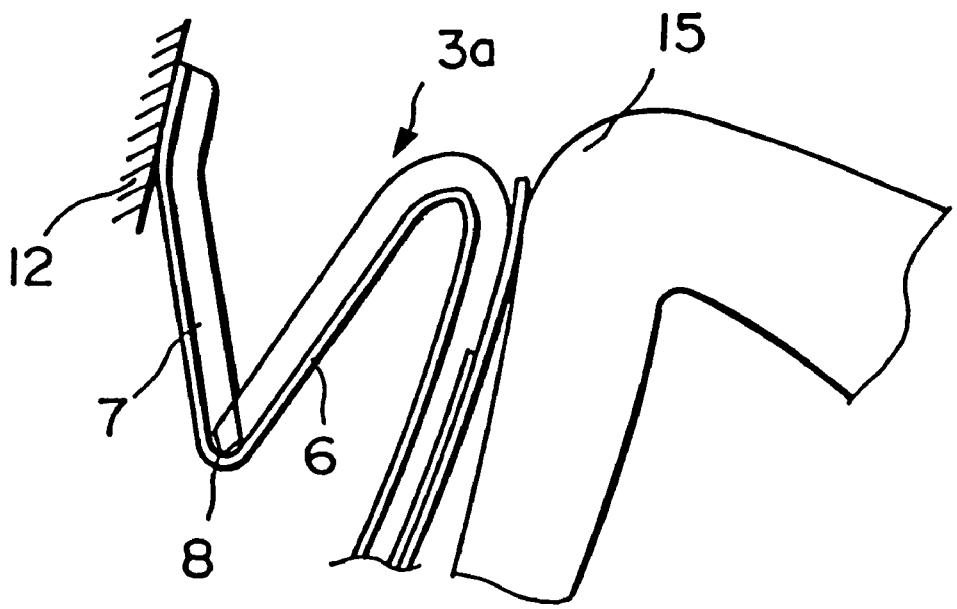
FIG. 13 is a side view of the conventional knee bolster structure, showing the latter stage of deformation thereof.
Figure 14:
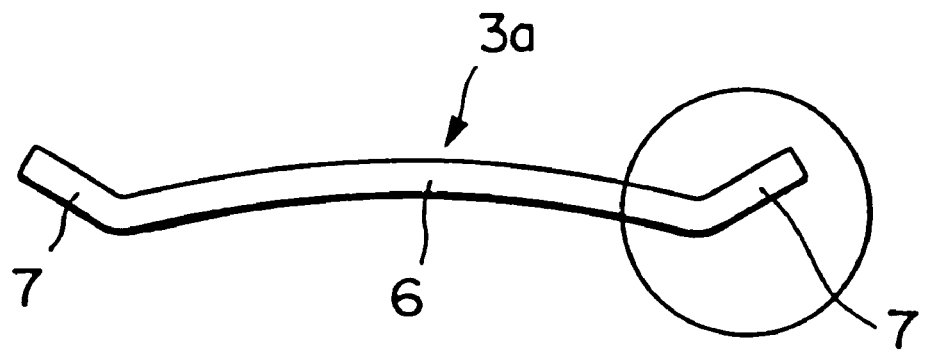
FIG. 14 is a section view of the stay of the conventional knee bolster structure, showing the outwardly opened defamation condition of the wall portions of the stay.

Now, description will be given below in detail of an embodiment of a knee bolster structure according to the invention with reference to the accompanying drawings. As shown in FIG. 1, a knee bolster 1 according to the invention mainly consists of a panel 2 and two stays 3, while each of the stay 3 is composed of a stay main body 4 and a patch 5. The panel 2 is composed of a flat plate member which is used to close an opening 16 formed in an instrument panel 13 and includes an arc-shaped surface flush with the instrument panel 13. And, in a vehicle collision or the like, as shown in FIG. 12, the knee 15 of an occupant strikes against the surface of the panel 2. The stay 3 are respectively interposed between a reinforcement (not shown) and the panel 2 and are fixed there.

Figure 4:
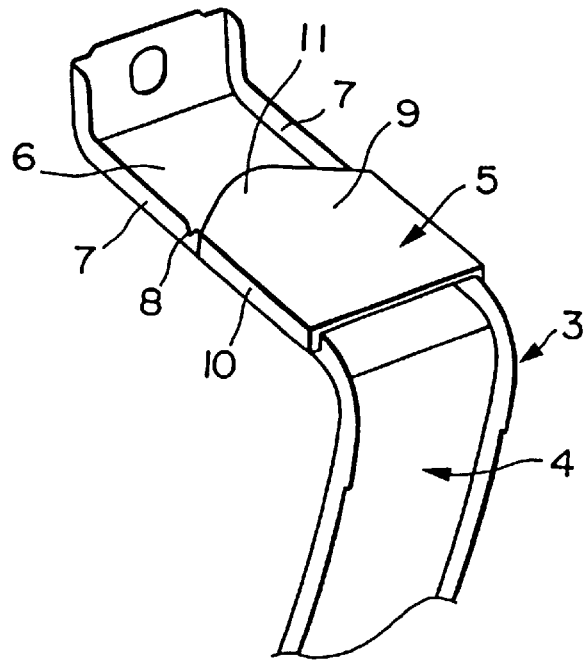
FIG. 4 is a perspective view of the detailed structure of a stay employed in a knee bolster structure according to the invention.

As shown in FIGS. 1 and 4, the stay main body 4 is formed of a member which not only includes a bottom surface 6 and two wall portions 7, 7 respectively rising from the bottom surface 6, with the bottom surface 6 and wall portions 7, 7 formed integrally with each other, but also has an upwardly facing U-shaped section. Also, as shown in FIGS. 4 and 5, on the upper edge side of the substantially central portion of each of the two wall portions 7 of the stay main body 4, there is opened up a notch 8 which has a proper depth.

Figure 2:
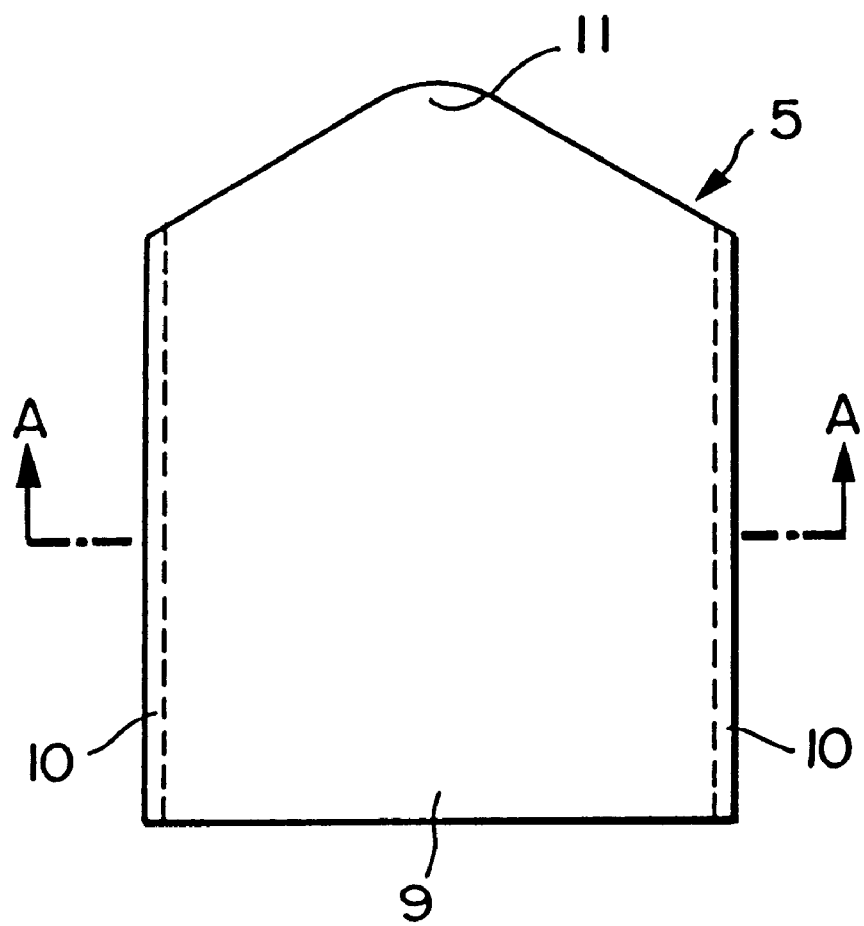
FIG. 2 is a plan view of a patch employed in a knee bolster structure according to the invention.
Figure 3:
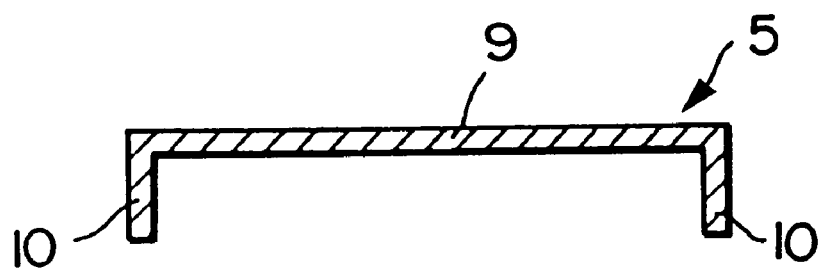
FIG. 3 is a section view taken along the line A—A shown in FIG. 2.
Figure 7:
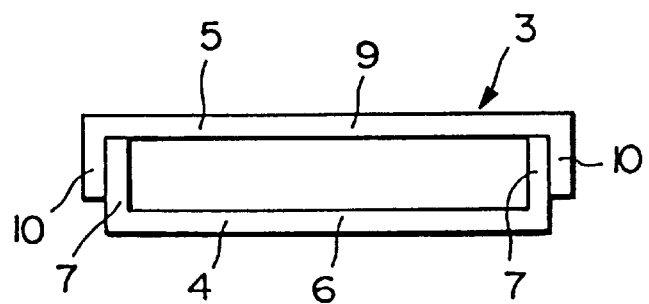
FIG. 7 is an enlarged section view taken along the line B—B shown in FIG. 5, showing a fitting condition between the wall portions of a stay main body of the stay and the side walls of the patch in a knee bolster structure according to the invention.

The patch 5, as shown in FIGS. 2 and 3, not only includes an top plate 9 and two side walls 10, 10 respectively projecting downwardly from the two sides of the top plate 9 but also has a downwardly facing U-shaped section. Also, as shown in FIGS. 1, 4, 5 and the like, the patch 5 is so disposed as to cover the upper surface of the stay main body 4, while the side walls 10, 10 of the patch 5, as shown in FIG. 7, are respectively fitted into the wall portions 7, 7 of the stay main body 4 from outside. Further, according to the present embodiment, the top plate 9 is made of a plate member which is shaped in such a manner that the leading end thereof projects toward the front side thereof to be fixed to a reinforcement 12 provided in the stay main body 4.

Figure 5:
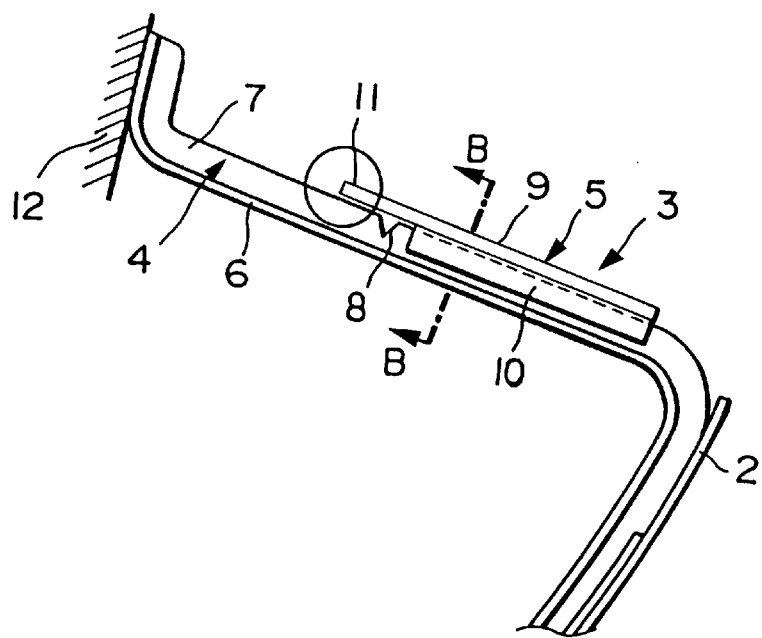
FIG. 5 is a side view of the stay shown in FIG. 4.

As described above, the patch 5 is fixed to the stay main body 4 in such a manner that the side walls 10 thereof are respectively fitted into the wall portions 7 of the stay main body 4, while the positions of the front-most ends of the fitted side walls 10, 10, as shown in FIG. 5, are situated in the rear of the portion where the notches 8 are formed. Also, as shown by a round mark in FIG. 5, the forwardly projecting portion of the leading end side 11 of the top plate 9 of the patch 5 is extended to and situated at a position which is present in front of the portion of the notch 8.

Figure 6:
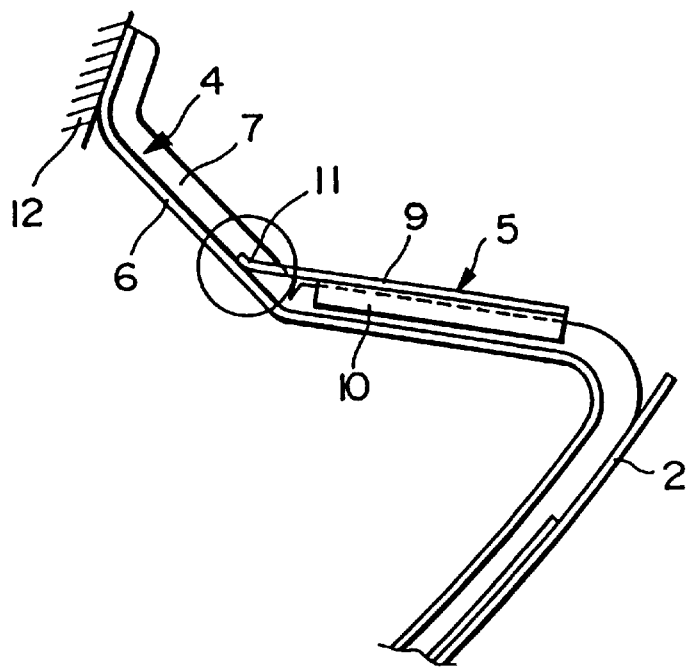
FIG. 6 is a side view of the stay, showing a state in which a knee bolster structure according to the invention is being deformed.
Figure 8:
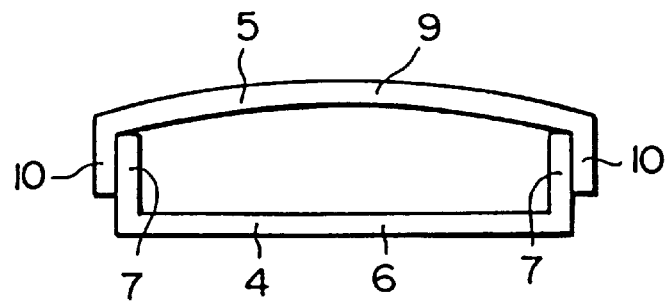
FIG. 8 is a section view of the stay and patch shown in FIG. 7, showing the deforming condition of the stay when a shock is applied.

Next, description will be given below of the operation of the knee bolster structure according to the invention when a vehicle collides with another vehicle. As shown in FIG. 5, the stay 3, which now includes the patch 5 and stay main body 4 with the patch 5 fixed thereto, is fixed on the front side thereof to the reinforcement 12, whereas the rear side of the present stay 3 is fixed to the panel 2 which is situated substantially flush with the instrument panel 13 (FIG. 1). In this state, the leading end side 11 of the top plate 9 of the patch 5 is situated at a position which is distant by a proper clearance from the stay main body 4. In a vehicle collision, if the panel 2 is pushed by the knee 15 of the occupant, then the stay 3 begins to bend starting from the notch 8 portion that is the weakest portion in the stay 3, thereby being able to absorb the shock energy that is caused by the vehicle collision. When the stay main body 4 is deformed to a certain degree, as shown in FIG. 6, the leading end side 11 of the top plate 9 of the patch 5 is butted against the bottom surface 6 of the stay main body 4 in such a manner as shown by a round mark. This can restrict the deformation of the stay main body 4 starting from the notch 8 portion and, therefore, the stay main body 4 is deformed while it is lightly reinforced by the patch 5, and continues to be able to absorb the shock energy. That is, because the concentration of stresses on the notch 8 as in the prior art is prevented, there is eliminated the possibility that the stay main body 4 can be deformed suddenly or the load thereof can be lowered suddenly. Also, as shown in FIG. 8, the side walls 10 of the patch 5 prevent the wall portions 7 of the stay main body 4 from being deformed in an outwardly opened manner. As a result of this, the drag of the stay 3 varies little. That is, according to the present embodiment, the stay 3 can be deformed in such a manner that the drag thereof is little lowered, and thus can absorb the shock energy efficiently.

Figure 9:
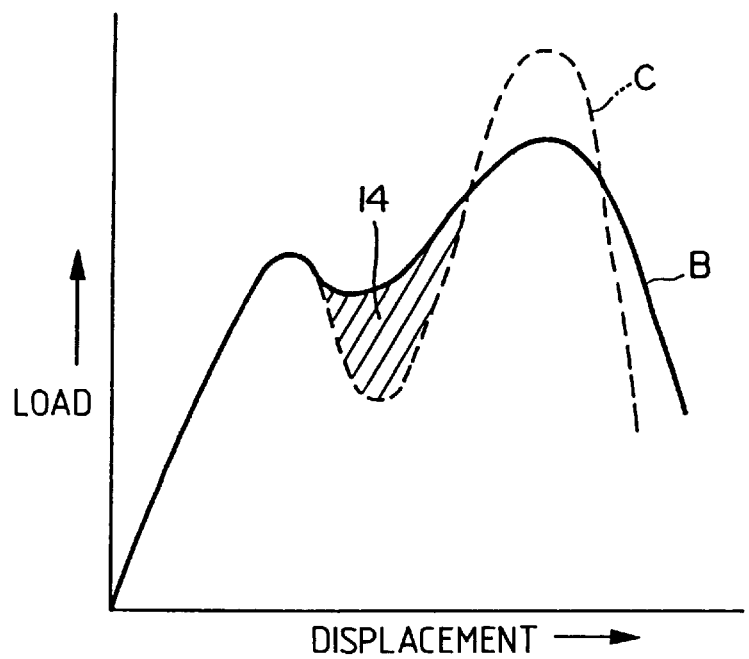
FIG. 9 is a graphical representation of a difference in a load-displacement relationship between a knee bolster structure according to the invention and a conventional knee bolster structure.
Figure 10:
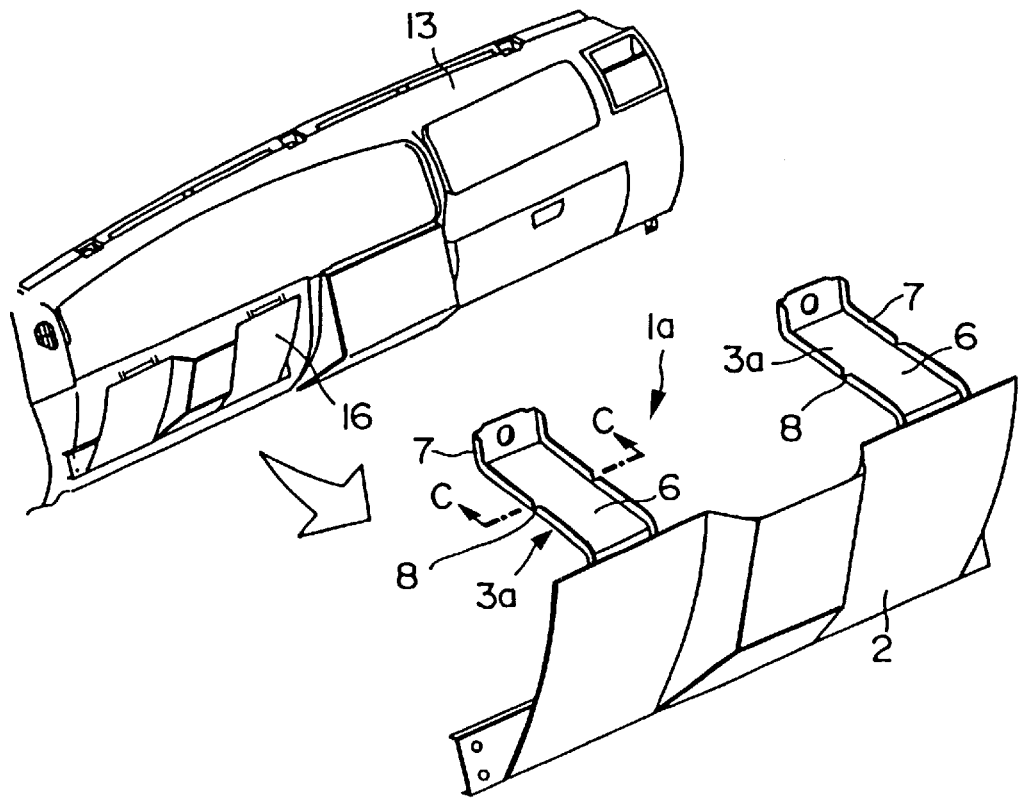
FIG. 10 is a perspective view of the whole structure of a knee bolster structure according to the prior art, explaining the mounting position thereof.
Figure 11:
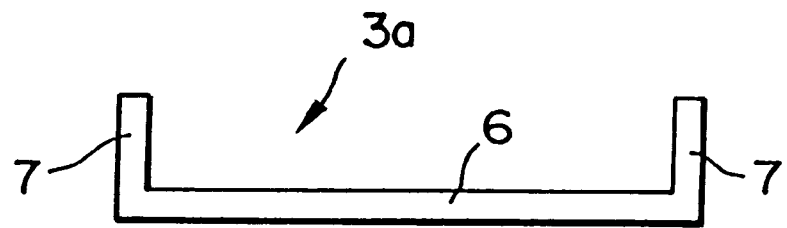
FIG. 11 is a section view of a stay employed in the above conventional knee bolster structure.

Now, in a graphical representation of a load-displacement relationship in FIG. 9, a solid line B shows the deformation state of the knee bolster 1 according to the present embodiment of the invention. As shown in FIG. 9, according to the present embodiment, there is eliminated an extreme load drop portion 14 (shown by hatching) which occurs in the prior art and thus the shock energy is absorbed in advance by an amount equivalent to the drop portion 14. This prevents occurrence of the peak of the load in the latter half stage of the knee bolster deformation that occurs in the prior art, so that the load-displacement curve shows a flat state as a whole. Thanks to this, the present knee bolster can function as an efficient knee bolster which can absorb the shock energy efficiently while maintaining the drag thereof substantially at a constant level.

In the foregoing description, the patch 5 is described such that it has such a shape as shown in the accompanying drawings, but the shape of the leading end side 11 of the patch 5 is not limited to the shown shape. That is, any other structure can be employed, provided that it can be contacted with the bottom surface 6 of the stay main body 4 to prevent the stress concentration on the notch 8. By the way, the notch 8 can be formed by any means such as by drilling a hole or the like, provided that it can set a bending point at a constant position to thereby stabilize the bending mode of the stay 3.

In a knee bolster structure according to the invention, due to employment of a structure in which there is provided a patch for covering the stay main body to thereby not only prevent the stress concentration on the notch during the deformation of the stay or the knee bolster but also prevent the wall portions of the stay main body from being opened outwardly, the bending mode of the stay can be stabilized as well as the shock energy caused by a vehicle collision can be absorbed while maintaining the drag of the stay or the knee bolster substantially in a constant level. This can protect the occupant against the shock energy in a vehicle collision.

In a knee bolster structure according to the invention, since the side walls of the patch are respectively positioned in the rear of the notches and the leading end side of the top plate of the patch is situated in front of the notches, the notches and patch are allowed to fulfil their respective functions, thereby being able to stabilize the deforming mode of the knee bolster.

What is claimed is:
1. A knee bolster structure comprising:
   a panel, which is mountable on an instrument panel of a vehicle;
   a stay having one end side fixed to the panel with a base end side thereof fixable to a reinforcement, said stay including:
      a stay main body having an upwardly facing U-shaped section and including a bottom surface and two wall portions respectively rising from two sides of said bottom surface, said bottom surface and wall portions being formed integrally with each other, and a patch having a downwardly facing U-shaped section and including a top plate with two side walls on two sides thereof for covering said stay main body, said patch being fixable to said stay main body in such a manner that said side walls thereof are respectively fitted into said two wall portions of said stay main body from outside, two notches respectively formed substantially in central portions of said two wall portions of said stay main body, and a leading end side of said top plate of said patch being formed such that it can be contacted with said bottom surface of said stay main body when said stay main body is bent.

2. A knee bolster structure as set forth in claim 1, wherein said side walls of said patch are respectively fitted into said wall portions of said stay main body at positions displaced from formation portions where said notches are formed, and said leading end side of said top plate of said patch is situated at a position which is nearer to said base end side of said stay main body than the formation portions of said notches.

\* \* \* \* \*